US011094954B2

(12) United States Patent
Fukazawa et al.

(10) Patent No.: US 11,094,954 B2
(45) Date of Patent: Aug. 17, 2021

(54) ELECTRODE, MEMBRANE ELECTRODE ASSEMBLY, ELECTROCHEMICAL CELL, STACK, FUEL CELL, VEHICLE AND FLYING OBJECT

(71) Applicant: Kabushiki Kaisha Toshiba, Minato-ku (JP)

(72) Inventors: Taishi Fukazawa, Meguro (JP); Wu Mei, Yokohama (JP); Yuta Kanai, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 377 days.

(21) Appl. No.: 15/907,902

(22) Filed: Feb. 28, 2018

(65) Prior Publication Data
US 2019/0088967 A1    Mar. 21, 2019

(30) Foreign Application Priority Data
Sep. 21, 2017 (JP) .............................. JP2017-181751

(51) Int. Cl.
*H01M 8/1004* (2016.01)
*H01M 8/242* (2016.01)
*H01M 8/04291* (2016.01)
*H01M 4/88* (2006.01)
*H01M 4/64* (2006.01)
(Continued)

(52) U.S. Cl.
CPC ........... *H01M 8/1004* (2013.01); *H01M 4/64* (2013.01); *H01M 4/8605* (2013.01); *H01M 4/8626* (2013.01); *H01M 4/8657* (2013.01); *H01M 4/881* (2013.01); *H01M 8/0245* (2013.01); *H01M 8/04291* (2013.01); *H01M 8/242* (2013.01); *H01M 2008/1095* (2013.01);
(Continued)

(58) Field of Classification Search
CPC ............. H01M 8/1004; H01M 4/8605; H01M 8/0245; H01M 4/8626; H01M 4/8657; H01M 4/64; H01M 4/881; H01M 8/04291; H01M 8/242; H01M 2008/1095; H01M 2250/20; Y02T 90/40; Y02E 60/50
See application file for complete search history.

(56) References Cited

U.S. PATENT DOCUMENTS 5,620,807 A     4/1997  Mussell et al.
2007/0148531 A1 6/2007  Yoshizawa et al.
(Continued)

FOREIGN PATENT DOCUMENTS

EP  2 990 116 A1  3/2016
JP  2003-59498    2/2003
(Continued)

OTHER PUBLICATIONS

Zijie Lu et al. "Influence of MPL Structure Modification on Fuel Cell Oxygen Transport Resistance", ECS Transctions, vol. 69, No. 17, 2015, pp. 1341-1353.

*Primary Examiner* — Philip A. Stuckey
(74) *Attorney, Agent, or Firm* — Oblon, McClelland, Maier & Neustadt, L.L.P.

(57) ABSTRACT

An electrode of an embodiment includes a catalyst layer having pores. A mode diameter of the pores is 10 μm or more and 100 μm or less. The catalyst layer may have a thickness of 0.05 μm or more and 3.0 μm or less. A value of the mode diameter of the pores may three times or more a value of a thickness of the catalyst layer.

18 Claims, 14 Drawing Sheets

(51) Int. Cl.
  *H01M 4/86* (2006.01)
  *H01M 8/0245* (2016.01)
  *H01M 8/1018* (2016.01)

(52) U.S. Cl.
  CPC .......... *H01M 2250/20* (2013.01); *Y02E 60/50* (2013.01); *Y02T 90/40* (2013.01)

(56) References Cited

U.S. PATENT DOCUMENTS

| | | |
|---|---|---|
| 2008/0206616 A1 | 8/2008 | Atanassova et al. |
| 2010/0136457 A1* | 6/2010 | Yamada .............. H01M 4/8605 429/480 |
| 2011/0318661 A1* | 12/2011 | Uensal ................ H01M 4/8636 429/428 |
| 2012/0251915 A1 | 10/2012 | Mei et al. |
| 2013/0078549 A1 | 3/2013 | Fukazawa et al. |
| 2016/0087281 A1 | 3/2016 | Mashio et al. |
| 2016/0087282 A1* | 3/2016 | Mei ..................... H01M 4/8621 429/482 |
| 2016/0133944 A1 | 5/2016 | Saha et al. |

FOREIGN PATENT DOCUMENTS

| | | |
|---|---|---|
| JP | 3523484 | 4/2004 |
| JP | 2008-262741 | 10/2008 |
| JP | 2010-102879 A | 5/2010 |
| JP | 2012-178360 | 9/2012 |
| JP | 2012-204221 | 10/2012 |
| JP | 2013-73695 | 4/2013 |
| JP | 2013-161737 | 8/2013 |
| WO | WO 2008/093895 A1 | 8/2008 |

* cited by examiner

ELECTRODE, MEMBRANE ELECTRODE ASSEMBLY, ELECTROCHEMICAL CELL, STACK, FUEL CELL, VEHICLE AND FLYING OBJECT

CROSS-REFERENCE TO RELATED APPLICATION

This application is based upon and claims the benefit of priority from Japanese Patent Application No. 2017-181751, filed on Sep. 21, 2017; the entire contents of which are incorporated herein by reference.

FIELD

Embodiments described herein relate to an electrode, a membrane electrode assembly, an electrochemical cell, a stack, a fuel cell, a vehicle, and a flying object.

BACKGROUND

A polymer electrolyte membrane fuel cell (PEFC) is a device which generates electricity using a proton conductive polymer electrolyte membrane by electrochemically reacting hydrogen serving as a fuel to be supplied to an anode side of the electrolyte membrane and oxygen (or air) serving as an oxidizing agent to be supplied to a cathode side of the electrolyte membrane. Compared with other fuel cells, the PEFC can operate at low temperature of 100° C. or less. Furthermore, since a reaction product of the PEFC is water and there is little burden on environment, it is urgent to commercialize the PEFC as a household stationary power source or a fuel cell vehicle (FCV). However, for widespread use of the PEFC, it is necessary to greatly reduce an amount of noble metal catalyst contained in a catalyst layer of each electrode.

Generally, a carbon-supported catalyst in which a noble metal catalyst material is supported on a carbon black carrier is used for the catalyst layer of the PEFC. For example, in a case where the PEFC is used as the FCV, a carbon carrier contained in the catalyst layer is corroded due to starting and stopping operations of the FCV, and as a result, deterioration of a noble metal catalyst layer and a membrane electrode assembly (MEA) is promoted. Therefore, development of the noble metal catalyst layer having high durability and high reaction area is indispensable for greatly reducing an amount of the noble metal catalyst to be used. Development of a carbonless catalyst layer formed by sputtering or evaporation can lead to avoid the deterioration due to the corrosion of the carrier. A catalyst layer precursor containing a pore-forming material and the noble metal catalyst material is formed, and then the pore-forming material is removed to prepare a catalyst layer having a laminated noble metal catalyst structure having pores, whereby it is intended to prepare a catalyst having the high reaction area. However, with a similar amount of catalyst, a thickness of this structure is $1/10$ to $1/100$ of a thickness of a conventional carbon black-supported noble metal catalyst, and the structure is susceptible to water. Therefore, an electromotive force of a cell may decrease depending on power generation environment, and it is necessary to improve robustness of the catalyst. Proton conductivity of a solid electrolyte membrane varies depending on water in the membrane, and in a case where an amount of water is small, the proton conductivity decreases. That is, in order to achieve high cell characteristics, it is said to be important to moisturize the electrolyte membrane in a saturated state or a state close to the saturation. Meanwhile, in a case where water generated in the cathode side is retained and the catalyst layer is filled with water, power generation performance deteriorates due to flooding in which diffusion of oxidizing gas is hindered. Therefore, in the fuel cell, management of water is very important, and it is necessary to achieve both discharge of the water and moisture retention of the electrolyte membrane.

A conventional gas diffusion layer (GDL) of the PEFC includes a water repellent micro porous layer (MPL) prepared by applying a mixed ink of fluororesin and carbon black particles to a conductive perforated sheet which has been subjected to water repellency treatment of carbon paper graphitized at high temperature, or carbon cloth made by knitting carbon fiber with the fluororesin, or the like. However, due to this water repellent MPL, part of the water produced by a cell reaction is repelled and pushed back to a catalyst side, causing flooding, which hinders the cell reaction and becomes a factor of lowering the electromotive force.

In order to prevent formation of a film of water on a surface of the water management layer (water repellent MPL) of the fuel cell, it is known that, in an oxidation electrode (cathode) of the fuel cell, an intermediate layer is disposed between the water management layer and the catalyst layer, this intermediate layer has a water repellent agent and a hydrophilic agent, and a gradient is provided for concentration of the water repellent agent such that concentration of a water repellent material decreases from a water management layer side toward the catalyst layer.

In addition, a fuel cell is known in which, by forming an MPL made of a powder having a core-shell structure including a water-absorbing core and a water repellent porous shell on the gas diffusion layer, flooding due to liquid water in the MPL is avoided, and excellent robustness is provided.

In addition, the water management layer having water repellency may push part of the produced water back to the catalyst side. In a case where the catalyst including the laminated noble metal catalyst structure having a porous structure without using a carrier further likely to generate flooding of the water in the catalyst layer due to its thinness. In particular, when the fuel cell is operated at a high current density (for example 1 A/cm$^2$ or more), efficient discharge of the water is extremely important for the fuel cell to exhibit its full performance.

DETAILED DESCRIPTION

An electrode of an embodiment includes a catalyst layer having pores. A mode diameter of the pores is 10 μm or more and 100 μm or less.

Hereinafter, embodiments of the present invention will be described in detail with reference to the drawings.

First Embodiment

Figure 1:
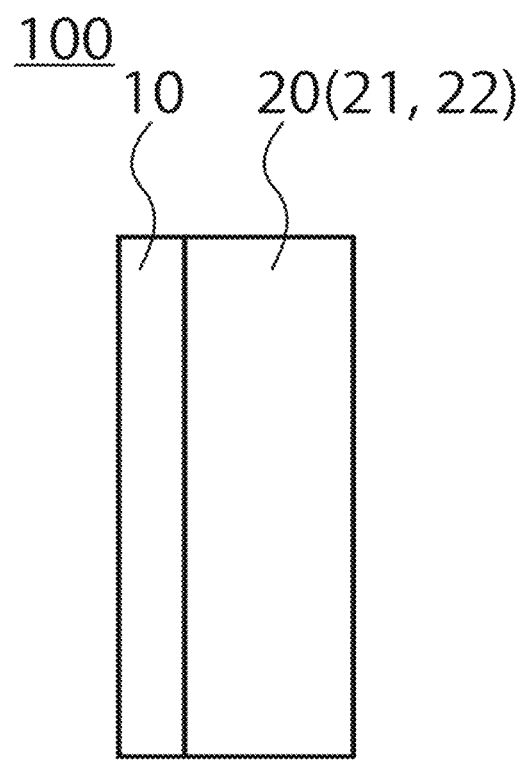
FIG. 1 is a schematic view of an electrode of an embodiment.

A first embodiment relates to an electrode having a catalyst layer. FIG. 1 is a schematic view of an electrode 100. The electrode 100 of FIG. 1 includes a catalyst layer 10 and a support layer 20. The support layer 20 includes, for example, a water management layer 21 and a gas diffusion layer 22. The water management layer 21 is disposed between the catalyst layer 10 and the gas diffusion layer 22. The electrode 100 of the embodiment is suitable as an electrode for a fuel cell. A layer having both a water management property and gas diffusibility can be used in place of the water management layer 21 and the gas diffusion layer 22.

Figure 2:
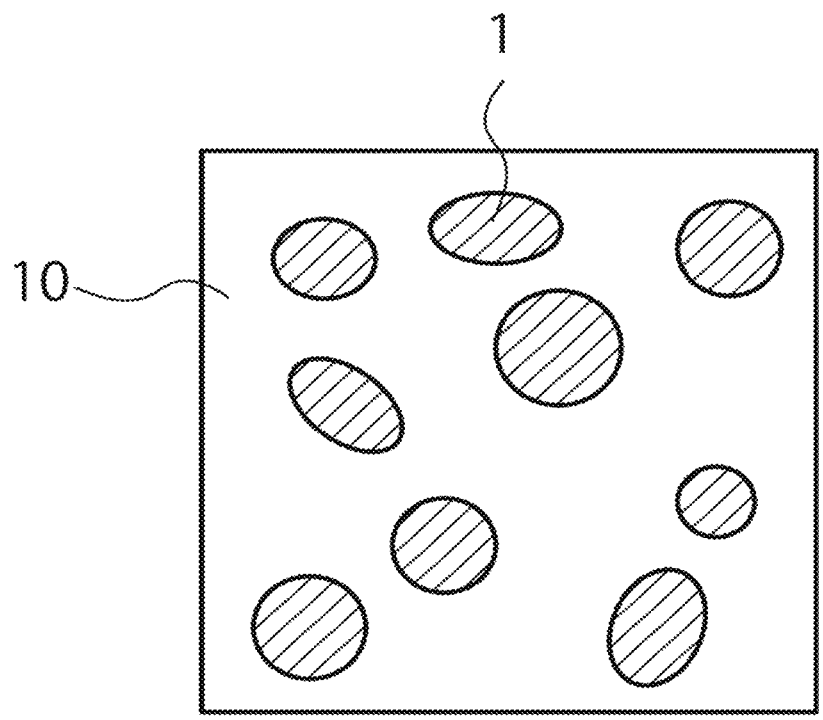
FIG. 2 is a top view of a catalyst layer of the embodiment.

The catalyst layer 10 includes a catalyst unit, and pores 1 are present in the catalyst layer 10. The catalyst unit has a porous structure or a laminated structure. The pores 1 are present in the layered catalyst layer 10. FIG. 2 is a schematic top view of the catalyst layer 10. As illustrated in the catalyst layer 10 of FIG. 2, the pores 1 having a large diameter, that is, gap regions which are recognized as the pores 1, in which no catalyst unit is present, are dotted in the catalyst layer 10.

Figure 3A:
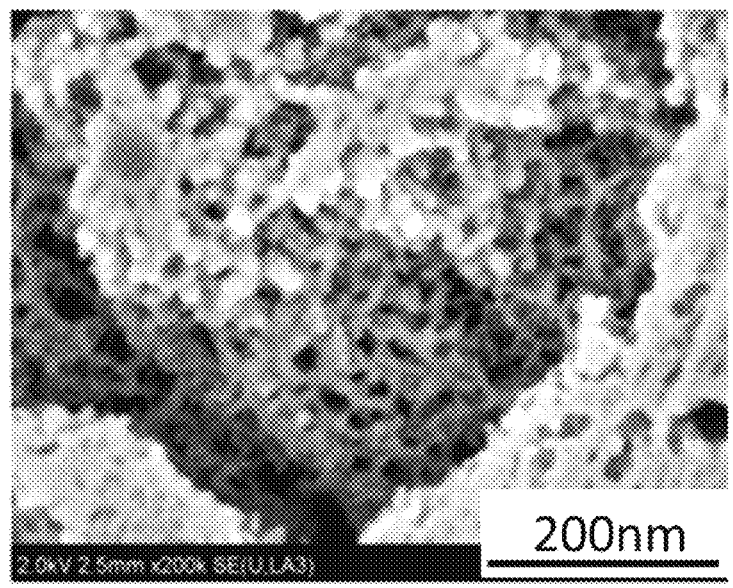
FIG. 3A is a low magnification transmission micrograph of a catalyst unit of the embodiment.
Figure 3B:
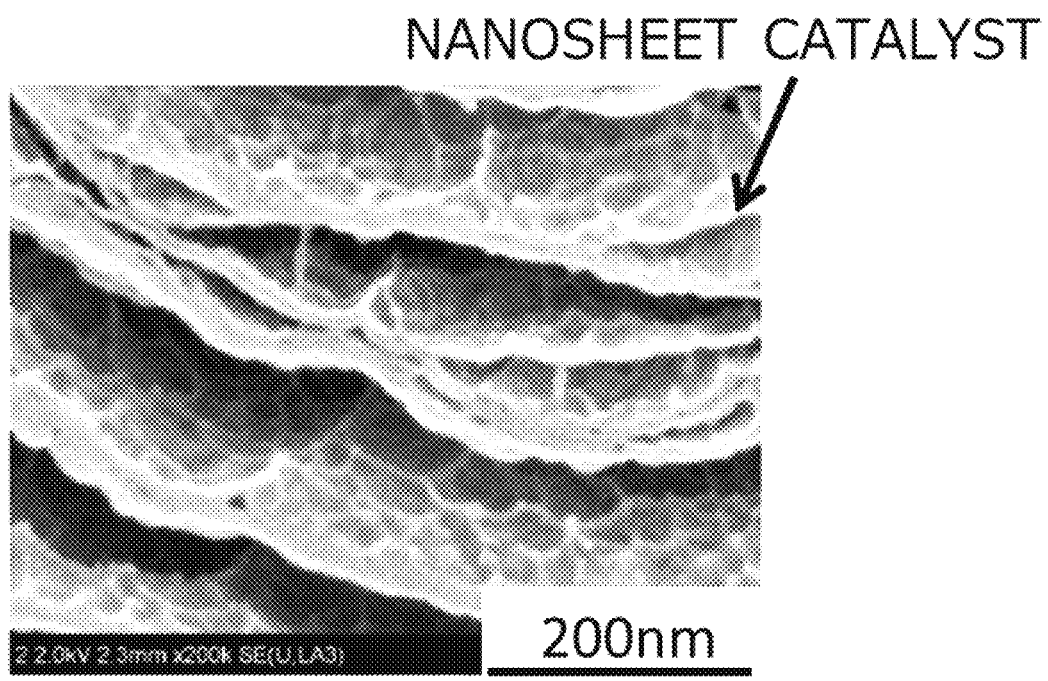
FIG. 3B is the low magnification transmission micrograph of the catalyst unit of the embodiment.

FIGS. 3A and 3B are low magnification transmission micrographs of the catalyst unit having the porous structure and the catalyst unit having a laminated structure including a gap layer. FIG. 3A shows the catalyst unit having the porous structure, and FIG. 3B shows the catalyst unit having the laminated structure including the gap layer. In a case where a catalyst material is supported on a carrier, the catalyst is generally in the form of nano-sized particles. In the case of the catalyst unit having the porous structure, the catalyst itself is in the form of a sponge having minute gaps of 2 nm or more and 100 nm or less. In the case of the catalyst unit having the laminated structure including the gap layer, the catalyst is in the form of a nanosheet. Use of the catalyst in the form of the sponge or the nanosheet makes it possible to improve characteristics of an electrochemical cell.

Since an electrocatalytic reaction occurs on a surface of the catalyst, a shape of the catalyst affects atomic arrangement and an electronic state of the surface of the catalyst. In the case of the catalyst unit having the laminated structure including the gap layer, it is desirable that adjacent nanosheets are partially integrated. This is because, although the mechanism has not yet been elucidated completely, it is considered that the configuration makes it possible to achieve proton conduction or hydrogen atom conduction for an electrode reaction more smoothly.

Figure 3C:
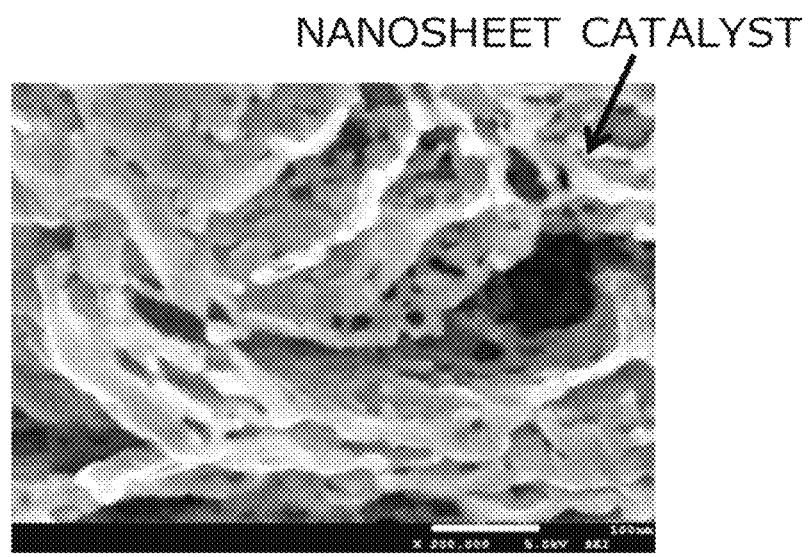
FIG. 3C is the low magnification transmission micrograph of the catalyst unit of the embodiment.
Figure 3D:
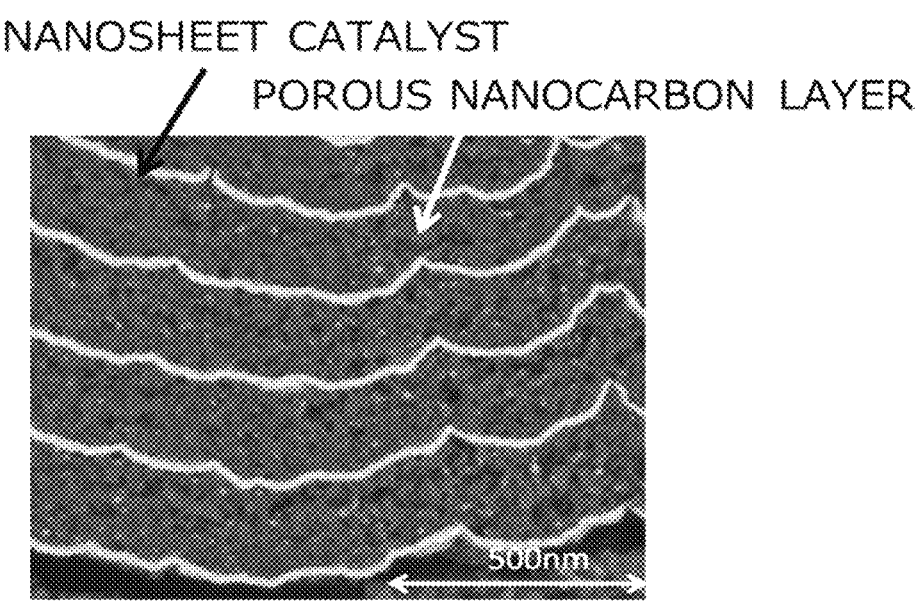
FIG. 3D is the low magnification transmission micrograph of the catalyst unit of the embodiment.

Further, as shown in the low magnification transmission micrograph of FIG. 3C, by making the nanosheets inside the laminated structure porous, more improved characteristics can be achieved. This is because the configuration can improve gas diffusion and water management. By arranging a porous nano-carbon layer containing fibrous carbon (low magnification transmission micrograph of FIG. 3D) or a nanoceramic material layer between the nanosheets inside the laminated structure, durability and robustness can be further improved. Since a catalyst contributing to a main electrode reaction is hardly supported by the fibrous carbon contained in the porous nano carbon layer, a laminated structure unit including the porous nano carbon layer is considered to be carrierless. Here, porosity of the catalyst layer is preferably 50 Vol. % or more and 90 Vol. % or less since movement of a substance such as discharge of water becomes smoother. In addition, the porosity of the catalyst layer within this range makes it possible to move the substance sufficiently without lowering utilization efficiency of a noble metal.

A predetermined catalyst material used for a carrierless catalyst layer according to the present embodiment includes, for example, at least one selected from the group consisting of noble metal elements such as Pt, Ru, Rh, Os, Ir, Pd, and Au. Such a catalyst material is excellent in catalytic activity, conductivity and stability. The above-mentioned metal can also be used as an oxide and may be a composite oxide or a mixed oxide containing two or more kinds of metals.

An optimum noble metal element can be appropriately selected according to a reaction in which the electrode 100 is used. For example, for a fuel cell, a catalyst having a composition represented by $Pt_u M_{1-u}$ is desirable, where u is in the range of $0 < u \leq 1$, and an element M is at least one selected from the group consisting of Co, Ni, Fe, Mn, Ta, W, Hf, Si, Mo, Ti, Zr, Nb, V, Cr, Al, and Sn. The catalyst contains Pt of more than 0 atomic % and not more than 90 atomic %, and the element M of not less than 10 atomic % and less than 100 atomic %.

An average thickness of a catalytic metal layer is typically 4 nm or more and 30 nm or less. A thickness of the gap layer is typically 4 nm or more and 30 nm or less. A length in a thickness direction of the catalyst unit is defined as a long side, and a length in a direction perpendicular to a long side direction at a ½ height of the long side of the catalyst unit is defined as a short side. An average ratio of the long side to the short side (long side:short side) is 1:1 or more and 10:1 or less.

A plurality of pores 1 is present on a main surface, which is a surface of the catalyst layer 10. The main surface of the catalyst layer 10 is two surfaces facing each other in a thickness direction of the catalyst layer 10. The pores 1 include a pore having a diameter of 5 μm or more. It is preferable that a mode diameter (the most frequent value of the diameter) of the pores 1 is 10 μm or more and 100 μm or less. More preferably, the mode diameter of the pores 1 is 10 μm or more and 50 μm or less. Still more preferably, the mode diameter of the pores 1 is 10 μm or more and 45 μm or less. Most preferably, the mode diameter of the pores 1 is 15 μm or more and 30 μm or less. A value of the mode diameter of the pores 1 in the embodiment is larger than a value of the thickness of the catalyst layer 10. The value of the mode diameter of the pores 1 in the embodiment is more preferably three times or more or five times or less the value of the thickness of the catalyst layer 10. The value of the mode diameter of the pores 1 in the embodiment is more preferably ten times or more the value of the thickness of the catalyst layer 10. Note that the catalyst layer 10 also includes gaps of several hundred nanometers or less (for example, 300 nm or less). Such gaps and the pores 1 serve as gas flow paths. Numerous fine gaps are present in the catalyst layer 10.

Such a large pore 1 serves as a water discharge path in the catalyst layer 10. In the thin catalyst layer 10 having a thickness of 0.05 µm or more and 3.0 µm or less, flooding of water is likely to occur as mentioned above. Since the pore of about 1 µm or less alone does not have a high water discharge function, a function of preventing flooding in the thin catalyst layer is not sufficient. It is not preferable that the mode diameter of the pores 1 is too large because an inactive region increases on the catalyst layer 10 and reaction efficiency per area of the catalyst layer 10 is lowered.

Figure 4:
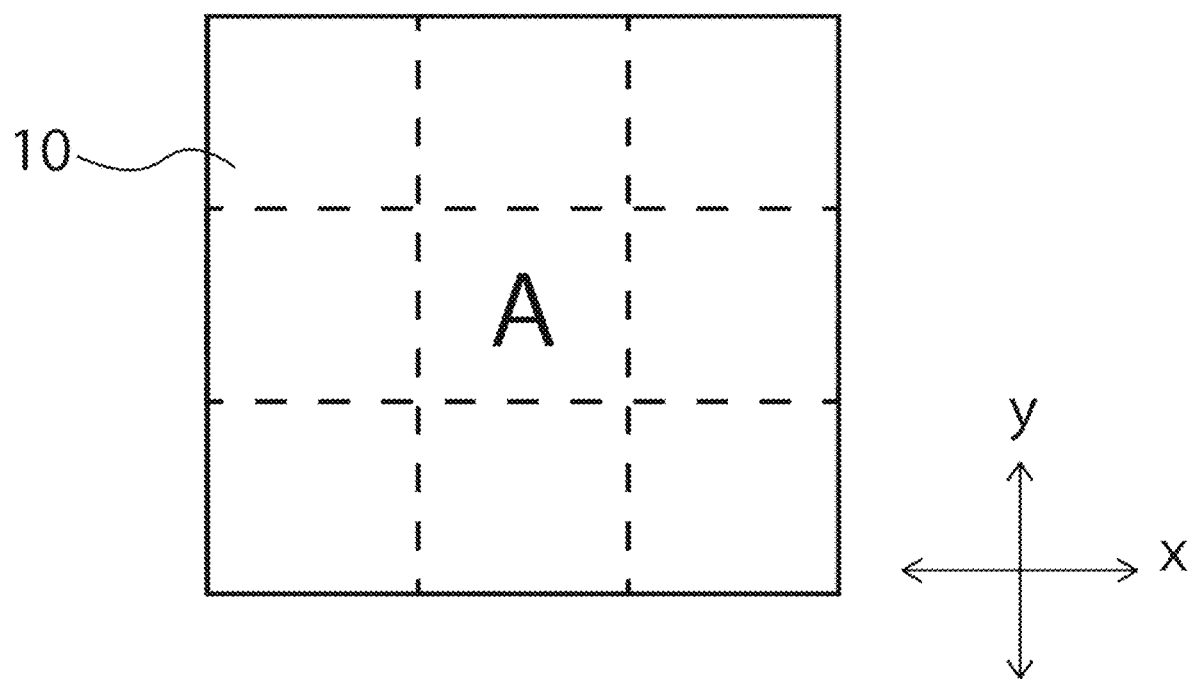
FIG. 4 is a schematic view showing a photographing area of the catalyst layer of the embodiment.
Figure 5:
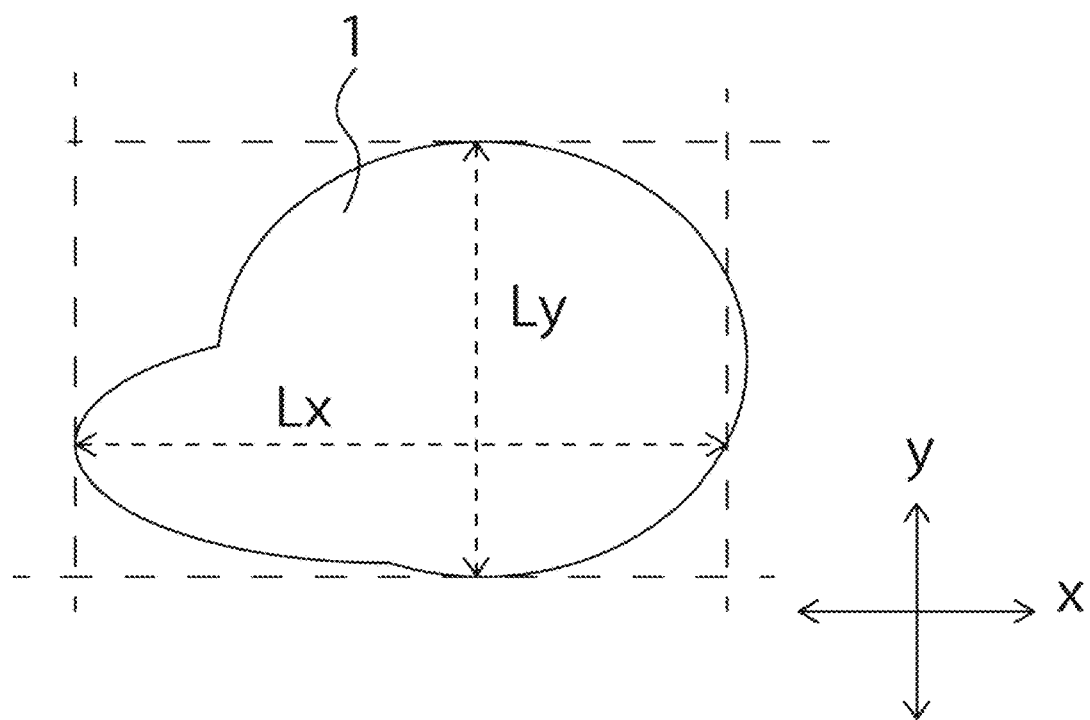
FIG. 5 is a schematic view illustrating a shape of a pore of the embodiment.

The diameter of the pore 1 is determined from a scanning electron microscope (SEM) image. The catalyst layer 10 is cut to 7.1 mm×7.1 mm from a center part thereof. As in the schematic view illustrating a photographing region of the catalyst layer 10 in FIG. 4, the catalyst layer 10 is vertically divided into three and horizontally divided into three, and a middle region A is photographed. A surface to be photographed is the main surface of the catalyst layer 10. A magnification of photographing is 250×, and a region of 1.0 mm×1.0 mm at a center of the region A is observed. The observed image is binarized with black color and white color using image processing/image measurement/data processing software WinROOF (MITANI CORPORATION). A white color after binarization shows a catalytic metal and a black color shows the pores 1. The diameter of the pore 1 is set to the larger one of a longest chord length in an x direction and a longest chord length in a y direction illustrated in FIG. 4. FIG. 5 is a schematic view of an example of a shape of the pore 1. In a case where the shape of the pore 1 is the shape illustrated in the schematic view of FIG. 5, since a maximum chord length Lx in the x direction is longer than a maximum chord length Ly in the y direction, the Lx is defined as the diameter (measured value) of the pore 1. Note that, in a case where another layer is in contact with the main surface of the catalyst layer 10, the catalyst layer 10 may be observed after grinding the layer or removing the layer by baking or the like. Note that, in a case where a ratio of a circumscribed circle diameter to an inscribed circle diameter (circumscribed circle diameter/inscribed circle diameter) of the pore 1 is 10 times or more, the pore is not treated as the pore 1 but as a crack to be mentioned later.

Note that the diameter of the pore 1 is defined by dividing the diameter for every 5 µm. When the pore 1 has a measured diameter (a value rounded off to one decimal place) of 0.0 µm or more and 4.9 µm or less, the diameter of the pore 1 is defined as 0 µm. When the pore 1 has a diameter of 5.0 µm or more and 9.9 µm or less, the diameter of the pore 1 is defined as 5 µm. When the pore 1 has a diameter of 10.0 µm or more, the diameter of the pore 1 is also defined by dividing the diameter for every 5 µm in the same manner. When this is generalized, when the measured diameter of each pore 1 is Rn (the value rounded off to one decimal place), the diameter of the pore 1 in the embodiment is a value obtained by rounding down Rn (µm)—4.9 µm to the nearest integer. Hereinafter, the diameter of the pore 1 which is not clearly indicated as the measured value represents the diameter which is defined by dividing the diameter for every 5 µm.

An average diameter (an average value of the diameter defined by dividing the diameter for every 5 µm) of the pores 1 is preferably 5 µm or more and 150 µm or less. It is not preferable that the average value is too small, because water is hardly discharged from the catalyst layer 10, and it is not preferable that the average value is too large, because an area where the catalyst unit does not exist increases, and the reaction efficiency per area of the catalyst layer 10 decreases. Preferably the average diameter of the pores 1 is in the range of 8 µm or more and 120 µm or less, and more preferably 10 µm or more and 70 µm or less.

The mode diameter (the most frequent value of the diameter defined by dividing the diameter for every 5 µm) of the pores 1 is obtained as follows. Five of the largest diameters of the pores 1 are selected, and the most frequent value among them is defined as the mode diameter of the pores 1. Note that, in a case where there are two or more most frequent values, a maximum value of the most frequent values is defined as the mode diameter of the pores 1. Further, when all five pores 1 have different diameters, the third largest value among the five diameter values is defined as the mode diameter.

It is more preferable that the pore 1 is a gap passing through the catalyst layer 10. The penetrating pore 1 is preferable in that the pore 1 has a high water discharge function. Although not all the pores 1 penetrate through the catalyst layer 10, it is preferable that 50% or more of the pores 1 having a diameter exceeding 10 µm pass through the catalyst layer 10. It is more preferable that 80% or more of the pores 1 having the diameter exceeding 10 µm pass through the catalyst layer 10.

An area ratio (%) of the pores 1 is a ratio of the measured area of the pores 1 (the sum of the areas of the respective pores 1) to the catalyst layer 10 (main surface). The area ratio of the pores 1 is preferably 20% or more and 60% or less. When the area ratio of the pores 1 is too high, the reaction efficiency per area of the catalyst layer 10 is lowered, which is not preferable. Further, when the area ratio of the pores 1 is too low, water tends to remain in the catalyst layer 10, which is not preferable. More preferably, the area ratio of the pores 1 is 20% or more and 50% or less, and more preferably 20% or more and 45% or less. The area ratio of the pores 1 is still more preferably 30% or more and 40% or less compared with the area ratio in the above ranges.

The area ratio of the pores 1 is derived from a binarized SEM image used for deriving the diameter of the pores 1. The area ratio of the pores 1 is an area ratio of a black area to the area of the binarized SEM image.

It is preferable that a ratio of the area of the pores 1 having a diameter of 10 µm or more (the sum of the areas of the respective pores 1 having a diameter of 10 µm or more) to the area of the catalyst layer 10 (main surface) is 10% or more and 55% or less. Since fine pores 1 are less likely to discharge water, flooding tends to occur in the catalyst layer 10 even when there are many fine pores and accordingly the area ratio of the pores 1 is high. Therefore, it is more preferable from a viewpoint of water discharge that the area ratio of the pores 1 having the diameter of 10 µm or more is 10% or more. More preferably, the area ratio of the pores 1 having a diameter of 10 µm or more is 15% or more and 55% or less, and still more preferably 20% or more and 55% or less. The area ratio of the pores 1 is yet still more preferably 25% or more and 35% or less.

The area ratio of the pores 1 having a diameter of 10 μm or more to the area of the catalyst layer 10 (main surface) is derived from the binarized SEM image used for deriving the diameter of the pores 1. The area ratio is an area ratio of a black color area of the pores 1 determined to have the diameter of 10 μm or more in the SEM image among the binarized black areas.

The catalyst layer 10 optionally includes an additive such as a hydrophilic agent. A noble metal catalyst having hydrophilicity may be formed by introducing a hydrophilic material into the noble metal catalyst. The hydrophilic material is preferably a hydrophilic polymer, and more preferably an ionomer having proton conductivity. Providing a hydrophilic ionomer makes it possible to promote the proton conductivity of the noble metal catalyst or adhesion between the catalyst and another member.

The support layer 20 is a layer that supports the catalyst layer 10. The support layer 20 is preferably made of a material excellent in the water management property and the gas diffusibility. The support layer typically includes the water management layer 21 and the gas diffusion layer 22. For example, in a case where the catalyst layer 10 has a sufficient water discharge property, the water management layer 21 can be omitted.

The water management layer 21 is a porous member that discharges water from the catalyst layer 10. The water management layer 21 has conductivity. The water management layer 21 is disposed adjacent to the catalyst layer 10, and can manage the amount of water in the catalyst layer 10 by receiving and discharging water contained in the catalyst layer 10. That is, the water management layer 21 is a member having a high water discharge property for the catalyst layer 10. The water management layer 21 makes it possible to suppress flooding particularly in the thin catalyst layer 10.

The water management layer 21 is, for example, a water repellent porous layer containing a water repellent material and a conductive material, or a hydrophilic porous layer containing the hydrophilic material and the conductive material. More specifically, the water management layer 21 includes a porous water repellent polymer and carbon fine particles. The water management layer 21 may further include the hydrophilic material to receive water from the catalyst layer 10.

In order that the water management layer 21 maintains the high water discharge property, the water management layer 21 has preferably a thickness in the range of 2 μm or more and 70 μm or less. In a case where the thickness of the water management layer 21 is too thin, it is difficult to control a preparation process. It is preferable that the thickness of the water management layer 21 is 5 μm or more and 50 μm or less because a balance between oxygen diffusibility and water discharge is easily obtained. In addition, when the thickness of the water management layer 21 exceeds 50 μm, since the gas diffusibility tends to deteriorate and the water discharge function tends to deteriorate, flooding may occur.

A void content of the water management layer 21 is preferably 30% or more and 80% or less. In a case where the void content is less than 30%, the gas diffusibility is low, and water cannot be efficiently discharged. On the other hand, in a case where the void content exceeds 80%, mechanical strength as the porous water management layer 21 is low and the water management layer tends to have a poor shape retaining property.

The gas diffusion layer 22 is a conductive porous layer. A thickness of the gas diffusion layer 22 is preferably 5 μm or more and 30 μm or less. Gas permeability of the gas diffusion layer 22 is preferably 1000 ml·mm/(cm$^2$·hr·mmAq) or more. From viewpoints of the gas diffusibility and structure maintenance, the void content of the gas diffusion layer 22 is preferably 50% or more and 90% or less. Typically, a porous carbon base material is used as the gas diffusion layer 22. Carbon felt, carbon paper and carbon cloth can be preferably used.

A surface of the gas diffusion layer 22 facing the catalyst layer 10 is partially covered with a water repellent agent. As the water repellent agent, it is preferable to use a fluororesin such as polytetrafluoroethylene (PTFE), polyvinylidene fluoride (PVDF), tetrafluoroethylene-hexafluoropropylene copolymer (FEP), tetrafluoroethylene-perfluoroalkylvinylether copolymer (PFA), which are chemically stable and have high water repellency.

Figure 6:
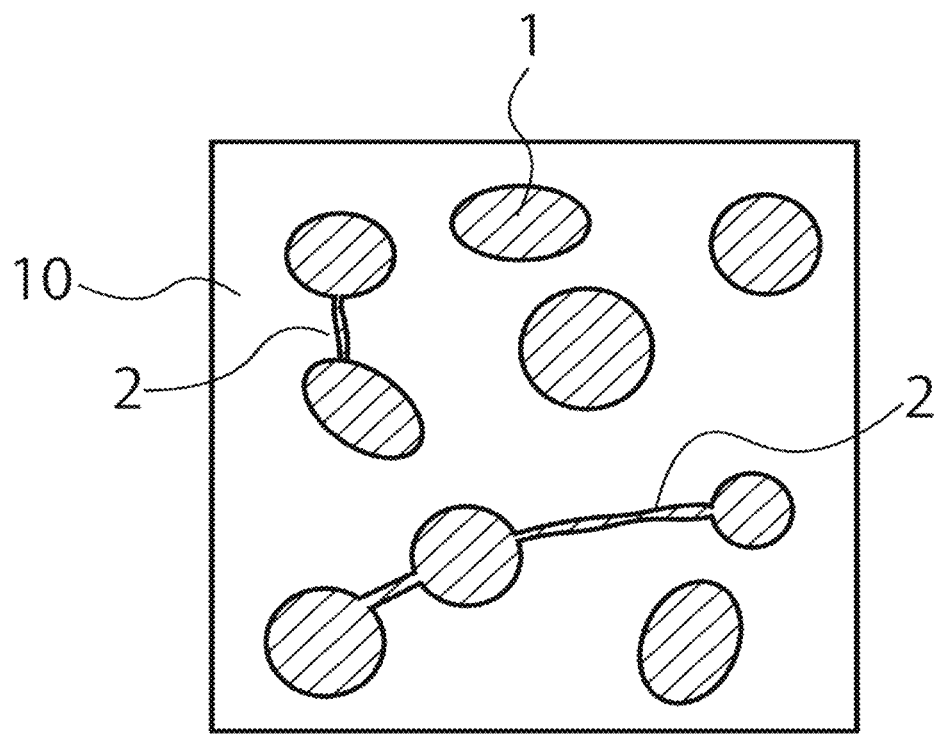
FIG. 6 is a top view of the catalyst layer of the embodiment.

Further, the catalyst layer of the first embodiment includes an embodiment including a crack 2 which is an elongated shaped gap such as the catalyst layer 10 illustrated in a schematic top view of FIG. 6. A width of the crack 2 is preferably 10.0 μm or less. The crack 2 is a gap which has an elongated shape and connects the pores 1. A length/width, which is an aspect ratio of the crack 2, is 10 or more. The crack 2 is preferably a gap connecting two or more pores 1. The crack 2 is preferable from a viewpoint of improving diffusibility of reactive gas in the catalyst layer 10 by connecting the pores 1 and further improving the water discharge property. The crack 2 alone has merely small effects of improving the water discharge property. However, a combination of the pores 1 and the crack 2 facilitates discharge of water. The shape of the crack 2 is measured by using the binarized SEM image used for observing the shape of the pores 1 and the like.

An example of a method of preparing the electrodes 100 and 101 of the embodiments is described. A slurry including a water repellent polymer such as PTFE, carbon particles, a viscous organic pore-forming solvent including glycerin, diglycerol, ethylene glycol, propylene glycol, butylene glycol, and polyethylene glycol, water, and alcohol is applied to the water repellent gas diffusion layer 22, and heated for drying to form the water management layer 21. At this time, it is preferable to repeatedly apply and dry the slurry. Then, Pt and a metal M as a pore-forming agent are sputtered alternately or simultaneously on the water management layer 21 and the metal M is removed, whereby the electrode 100, 101 of the embodiment can be obtained. The metal M can function as a co-catalyst for Pt by leaving part of the metal M.

According to the electrode 100 of the embodiment, robustness of the fuel cell using the catalyst layer 10 having the pores 1 to environmental temperature and humidity can be greatly improved. Generally, since the fuel cell including the catalyst layer 10 having the laminated structure or the porous structure including the catalytic metal layer and the gap layer has no carrier of the catalyst layer, the thickness of the catalyst layer is very thin, and when electricity is generated in a high humidity environment, especially when operating at a high current density, produced water is difficult to be discharged, and therefore the produced water remains in the cell. For this reason, it is difficult to take in oxygen (air), and a power reduction phenomenon called flooding is caused. A meaning of the robustness in the present disclosure is suppression of output fluctuation due to the phenomenon described above when the humidity of oxidizing gas supplied to the fuel cell rises, and the present disclosure aims to suppress this fluctuation to perform a stable operation. By improvement in the robustness in the present disclosure, a cell voltage (for example, @1.0 A/cm$^2$, V@1.0 A/cm$^2$) and power generation efficiency of the fuel cell are improved.

Second Embodiment

Figure 7:
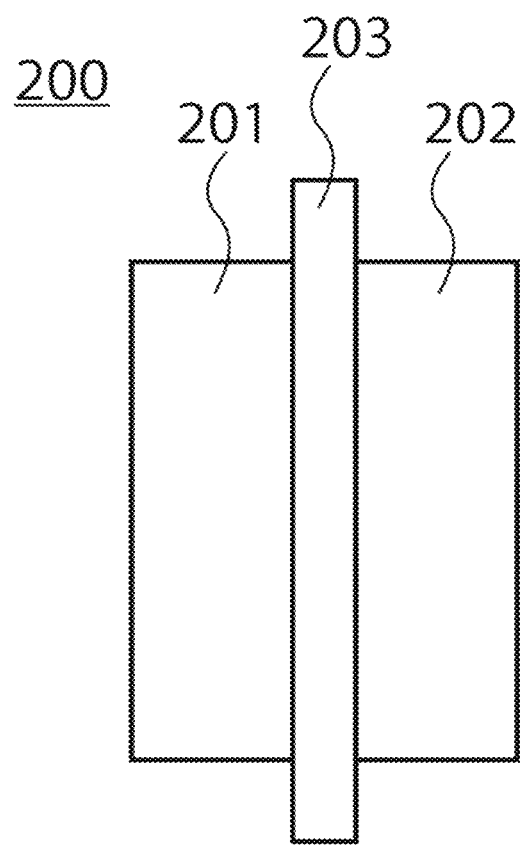
FIG. 7 is a schematic view of a membrane electrode assembly of an embodiment.

A second embodiment relates to a membrane electrode assembly (MEA). The electrode of the first embodiment is used for the MEA of the second embodiment. FIG. 7 is a schematic view of a MEA 200 of the embodiment. The MEA 200 includes a cathode 201, an anode 202, and an electrolyte membrane 203. The electrolyte membrane 203 is disposed between the cathode 201 and the anode 202. The anode 202 and the cathode 201 have a structure in which a catalyst layer and a support layer are laminated. The catalyst layer containing a catalytic metal of the cathode 201 and the anode 202 is present on an electrolyte membrane side. The catalyst layer 10 in which the pores 1 of the electrode of the MEA 200 is present faces an electrolyte membrane 203 side.

In a case where the MEA 200 is used for a fuel cell, hydrogen is supplied to the anode 202 and air is supplied to the cathode 201. In the cathode 201, water is generated by a fuel cell reaction using oxygen in the air as a raw material. At least using the electrodes 100 and 101 of the first embodiment for the cathode 201 is preferable from a viewpoint of improving the robustness by maintaining an appropriate relative humidity while avoiding flooding in the fuel cell using the MEA 200. It is preferable to use the electrode 100, 101 of the first embodiment for the anode 202. Further, in the electrode 100, 101 of the first embodiment, an electrode having no pores 1 may be used as the anode 202.

The electrolyte membrane 203 is a membrane required to have ionic conductivity. The electrolyte membrane 203 includes one or more electrolyte materials selected from the group consisting of fluororesin having a sulfonic acid group, tungstic acid and phosphotungstic acid. As the fluorine resin having a sulfonic acid group, for example, NAFION (trademark, DuPont), FLEMION (trademark, Asahi Glass Co., Ltd.), and Aciplex (trademark, Asahi Kasei Corp.) or the like is preferably used. Inorganic substances such as tungstic acid and phosphotungstic acid are also preferable as the electrolyte material. In a case where the membrane electrode assembly 200 of the embodiment is used for water electrolysis, it is preferable that the electrolyte membrane 203 further includes one or more selected from the group consisting of a hydrogen peroxide decomposer, a radical scavenger and a reinforcing material, to suppress deterioration of the film.

A thickness of the electrolyte membrane 203 can be appropriately determined in consideration of characteristics of the MEA 200. The thickness of the electrolyte membrane is preferably 5 μm or more and 300 μm or less, more preferably 5 μm or more and 200 μm or less from viewpoints of strength, resistance to dissolution and output characteristics of the MEA.

Note that, when the electrodes 100 and 101 according to the first embodiment are used as an electrode of the MEA 200, the electrolyte membrane 203 may exist in the pores 1. However, the pores 1 of the electrode can be observed by removing the electrolyte membrane 203 by polishing or baking or the like. In a case where the electrolyte membrane 203 is partially present in the pores 1 of the electrode, the pores 1 in the electrode may be evaluated after the electrolyte membrane 203 has been removed.

The MEA 200 is prepared by forming the electrolyte membrane 203 on either or both of the cathode 201 and the anode 202, superimposing them, heating and pressurizing them. For example, the MEA 200 can be prepared using a hot press machine. At that time, a pressing temperature may be higher than or equal to a glass transition temperature of a polymer electrolyte membrane used as a binder between the electrode and the electrolyte membrane, and can be, for example, 100° C. or more and 400° C. or less. A pressing pressure depends on hardness of the electrode and the polymer electrolyte membrane to be used, and can be set, for example, to 5 kg/cm$^2$ or more and 200 kg/cm$^2$ or less.

Third Embodiment

Figure 8:
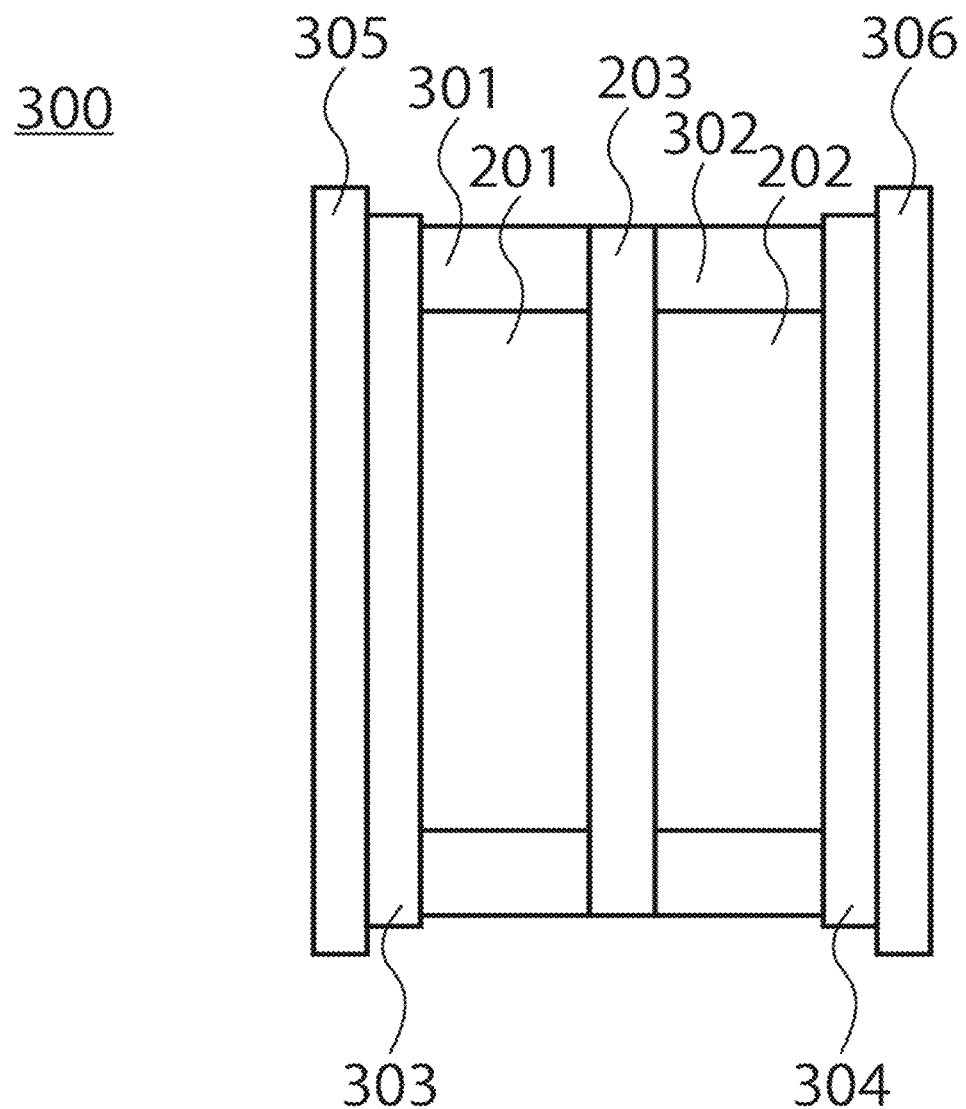
FIG. 8 is a schematic view of an electrochemical cell of an embodiment.

A third embodiment relates to an electrochemical cell. The electrochemical cell of the third embodiment uses the MEA of the second embodiment. A configuration of the electrochemical cell according to the present embodiment will be briefly described with reference to a schematic view of an electrochemical cell 300 in FIG. 8. The electrochemical cell 300 illustrated in FIG. 8 includes the cathode 201, the anode 202 and the electrolyte membrane 203 of the MEA 200, gaskets 301 and 302, current collector plates 303 and 304, and fastening plates 305 and 306, in which the current collector plates 303 and 304 and the fastening plates 305 and 306 are attached to both sides of the MEA 200 via the gaskets 301 and 302. Use of the electrodes 100 and 101 of the embodiment allows the electrochemical cell 300 of the embodiment to have improved robustness by maintaining an appropriate relative humidity, while avoiding flooding.

Fourth Embodiment

Figure 9:
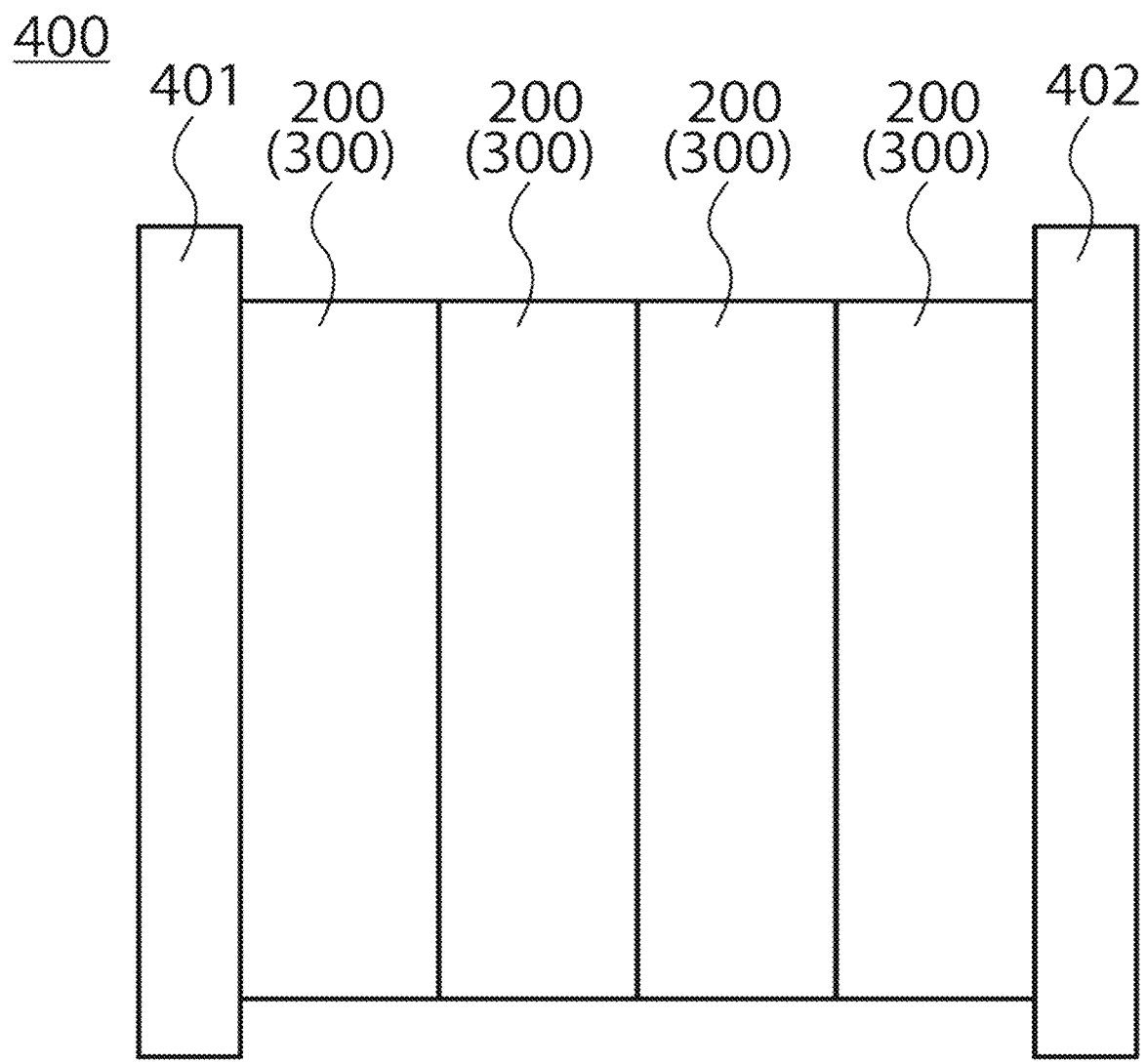
FIG. 9 is a schematic view of a stack of an embodiment.

A fourth embodiment relates to a stack. The stack of the fourth embodiment includes the membrane electrode assembly of the second embodiment or the electrochemical cell of the third embodiment. A configuration of the stack according to the present embodiment will be briefly described with reference to a schematic view of a stack 400 in FIG. 9. The stack 400 has a configuration in which a plurality of MEA 200 or a plurality of electrochemical cells 300 is connected in series. Fastening plates 401 and 402 are attached to both ends of the electrochemical cell. Use of the electrodes 100 and 101 of the embodiment allows the stack 400 of the embodiment to have improved robustness by maintaining an appropriate relative humidity, while avoiding flooding.

Fifth Embodiment

Figure 10:
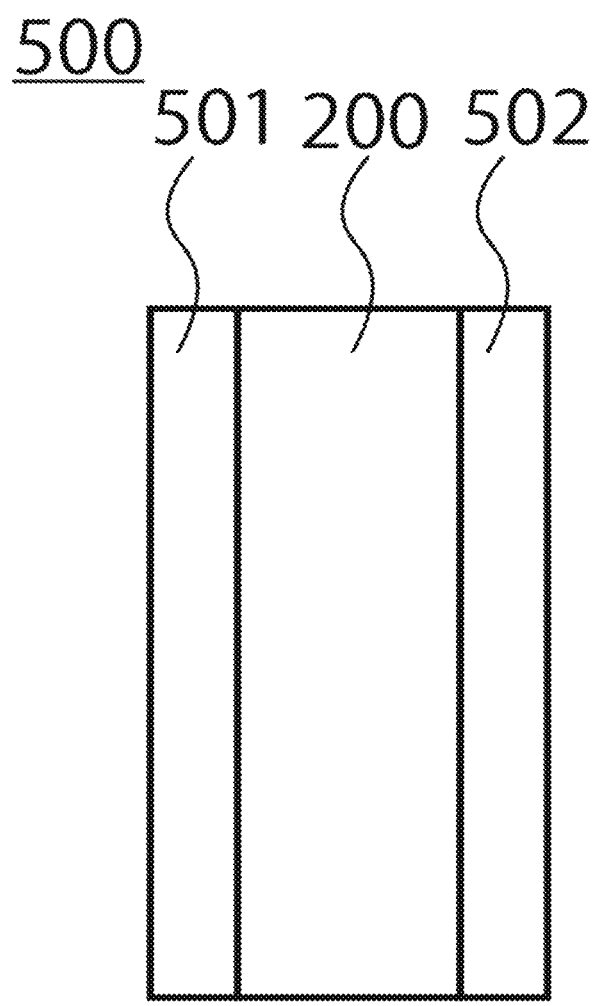
FIG. 10 is a schematic view of a fuel cell of an embodiment.

A fifth embodiment relates to a fuel cell. The fuel cell of the fifth embodiment includes the membrane electrode assembly of the second embodiment, the electrochemical cell of the third embodiment, or the stack of the fourth embodiment. A configuration of the fuel cell according to the present embodiment will be briefly described with reference to a schematic view of a fuel cell 500 in FIG. 10. The fuel cell 500 includes the MEA 200, a fuel supply unit 501, and an oxidizing agent supply unit 502. A hydrogen fuel tank (not illustrated) is connected to an anode of the fuel cell 500, and hydrogen is supplied from the tank. The hydrogen is used in the fuel cell 500. Instead of the MEA 200, the electrochemical cell 300 or the stack 400 may be used. Use of the electrodes 100 and 101 of the embodiment allows the fuel cell 500 of the embodiment to have improved robustness by maintaining an appropriate relative humidity, while avoiding flooding. The improvement in the robustness stabilizes output of the fuel cell. Electric power generated by the fuel cell 500 can be also stored in a storage battery (not illustrated).

Sixth Embodiment

Figure 11:
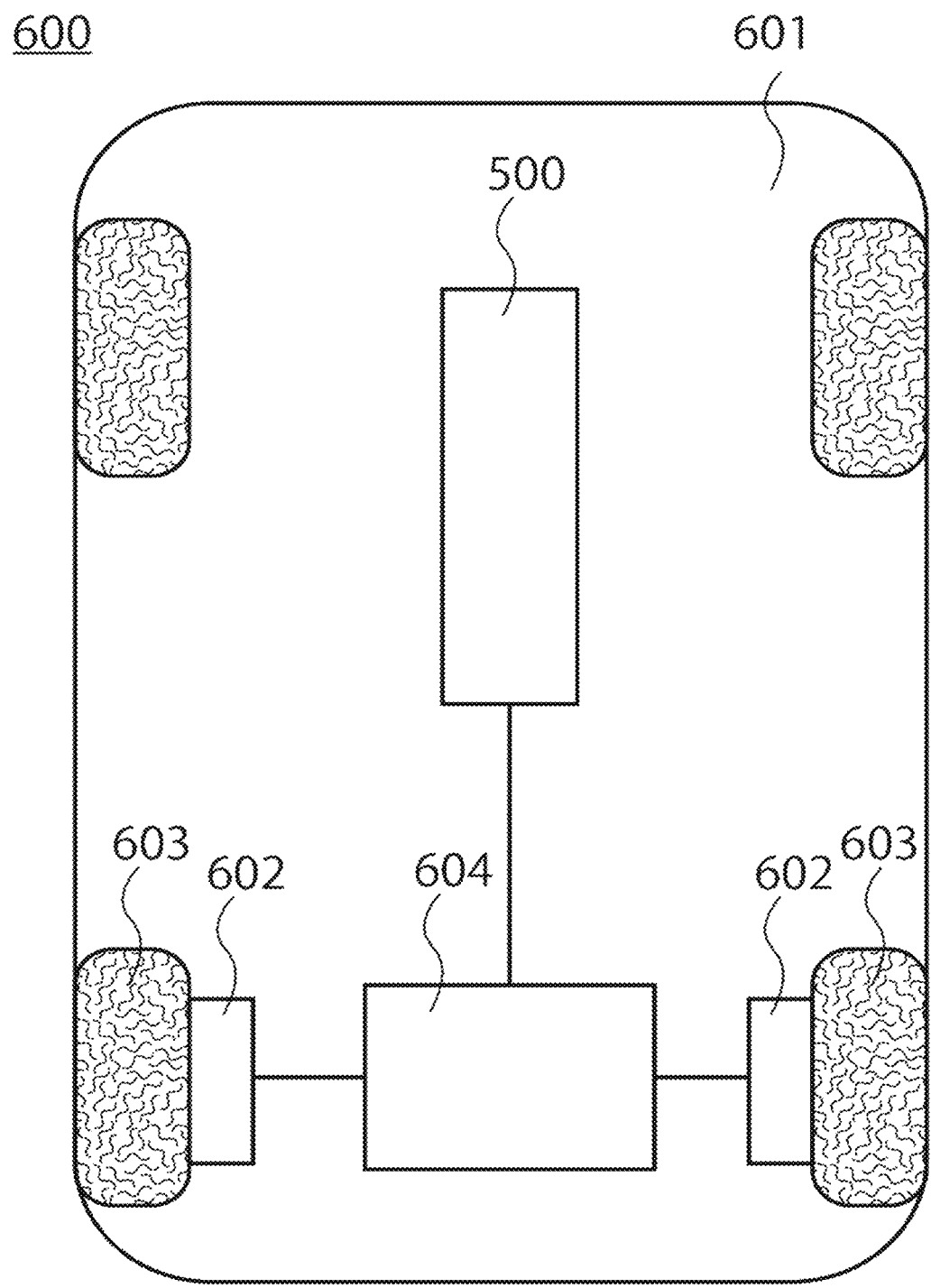
FIG. 11 is a schematic view of a vehicle of an embodiment.

A sixth embodiment relates to a vehicle. The vehicle of the sixth embodiment uses the fuel cell of the fifth embodiment. A configuration of the vehicle according to the present embodiment will be briefly described with reference to a schematic view of a vehicle 600 in FIG. 11. The vehicle 600 includes the fuel cell 500, a vehicle body 601, a motor 602, a wheel 603, and a control unit 604. The fuel cell 500, the motor 602, the wheel 603, and the control unit 604 are disposed in the vehicle body 601. A cathode and an anode of the fuel cell 500 are connected to the motor 602 serving as a load via the control unit 604. The control unit 604 converts electric power output from the fuel cell 500 and adjusts output. The motor 602 uses the electric power output from the fuel cell 500 to rotate the wheel 603. Use of the electrodes 100 and 101 of the embodiment allows the fuel cell 500 of the embodiment to have improved robustness by maintaining an appropriate relative humidity, while avoiding flooding. The Improvement in the robustness stabilizes the output of the fuel cell 500. Therefore, an operation of the vehicle 600 using such a fuel cell 500 is stabilized.

Seventh Embodiment

Figure 12:
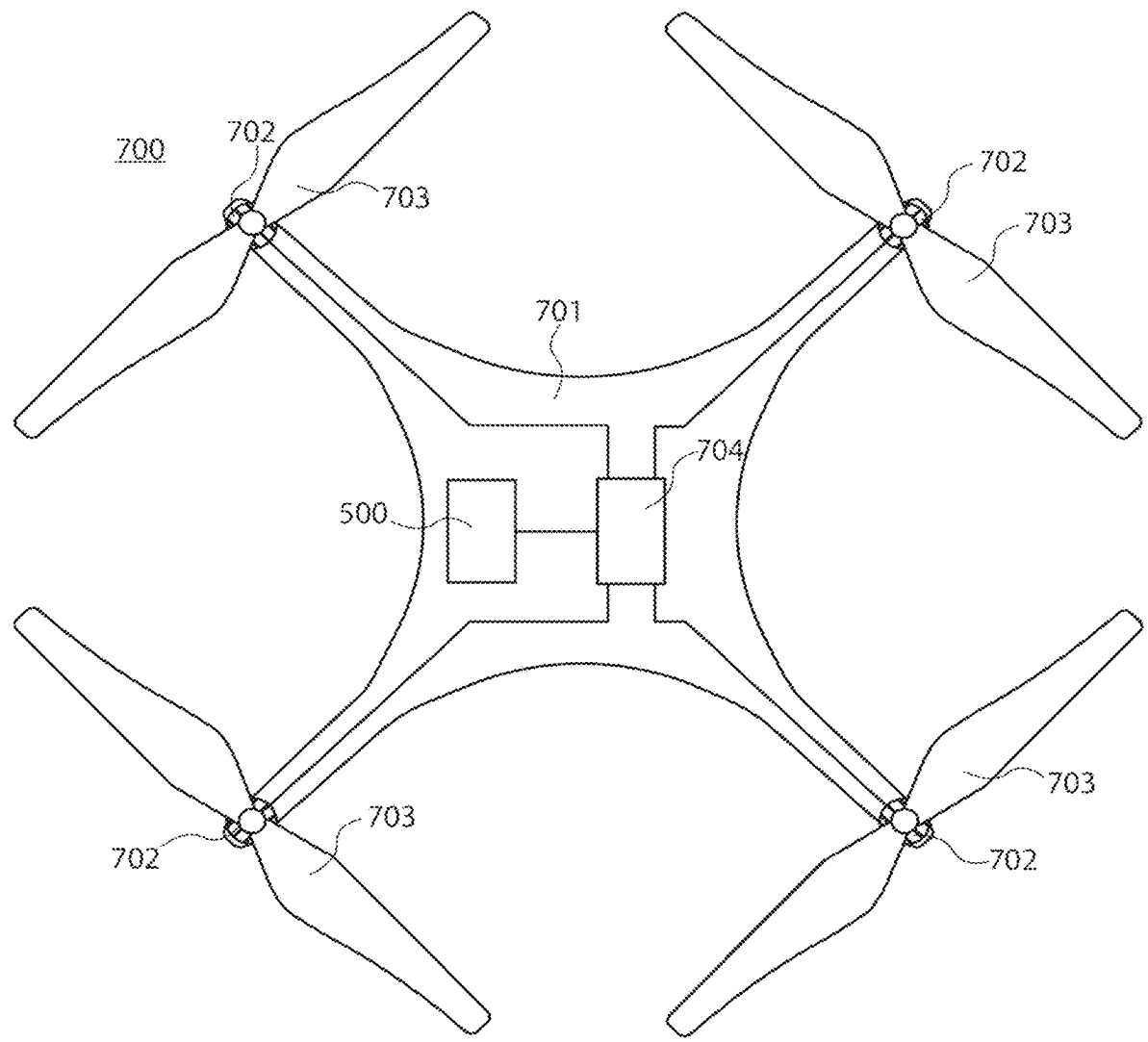
FIG. 12 is a schematic view of a flying object of an embodiment.

A seventh embodiment relates to a flying object (for example, a multicopter). The flying object of the seventh embodiment uses the fuel cell of the fifth embodiment. A configuration of the flying object according to the present embodiment will be briefly described with reference to a schematic view of a flying object (quadcopter) 700 of FIG. 12. The flying object 700 includes the fuel cell 500, an airframe 701, a motor 702, a rotary wing 703, and a control unit 704. The fuel cell 500, the motor 702, the rotary wing 703, and the control unit 704 are disposed in the airframe 701. The cathode and the anode of the fuel cell 500 are connected to the motor 702 serving as a load via the control unit 704. The control unit 704 converts the electric power output from the fuel cell 500 and adjusts the output. The motor 702 uses the electric power output from the fuel cell 500 to rotate the rotary wing 703. Use of the electrodes 100 and 101 of the embodiment allows the fuel cell 500 of the embodiment to have improved robustness by maintaining an appropriate relative humidity, while avoiding flooding. The improvement in the robustness stabilizes the output of the fuel cell 500. Therefore, an operation of the flying object 700 including such a fuel cell 500 is stabilized.

Hereinafter, a method for producing the electrode and the membrane electrode assembly according to an embodiment of the present disclosure will be described with reference to specific examples. Note that the examples to be mentioned later are examples of prominent embodiments of the present disclosure, and the present disclosure is not limited to the following examples.

Example 1

As a gas diffusion layer, a water management layer is formed on a surface of a nonwoven fabric by using a nonwoven fabric (German Freudenberg H23 I2) whose surface is subjected to water repellency treatment. The water management layer was formed by repeatedly applying a carbon slurry to the surface of the nonwoven fabric by spraying, and heating it for drying. The carbon slurry is prepared by mixing carbon particles (Cabot Vulcan XC 72), water, 2-propanol, ethanol, glycerin, polytetrafluoroethylene in a ratio of about 1:30:25:25:3:1. After thorough drying, heat treatment was performed at 360° C. for 10 minutes in an argon atmosphere to impart water repellency by polytetrafluoroethylene to the water management layer. Then, a surface of the water management layer was smoothed under a condition of a load of 12 kgf/cm$^2$ for three minutes at a room temperature. A thickness of the water management layer was 30 μm. Pt, and Co and Ni were alternately (Pt/CoNi alternately) sputtered such that an amount of Pt became 0.2 mg/cm$^2$. Co and Ni were dissolved by acid treatment to form a catalyst layer on the water management layer. Then, heat treatment was performed in forming gas (5%-H$_2$ and 95%-Ar) for 2 hours at 380° C. to obtain a cathode of Example 1. Part of Co and Ni remained in the catalyst layer.

Figure 13:
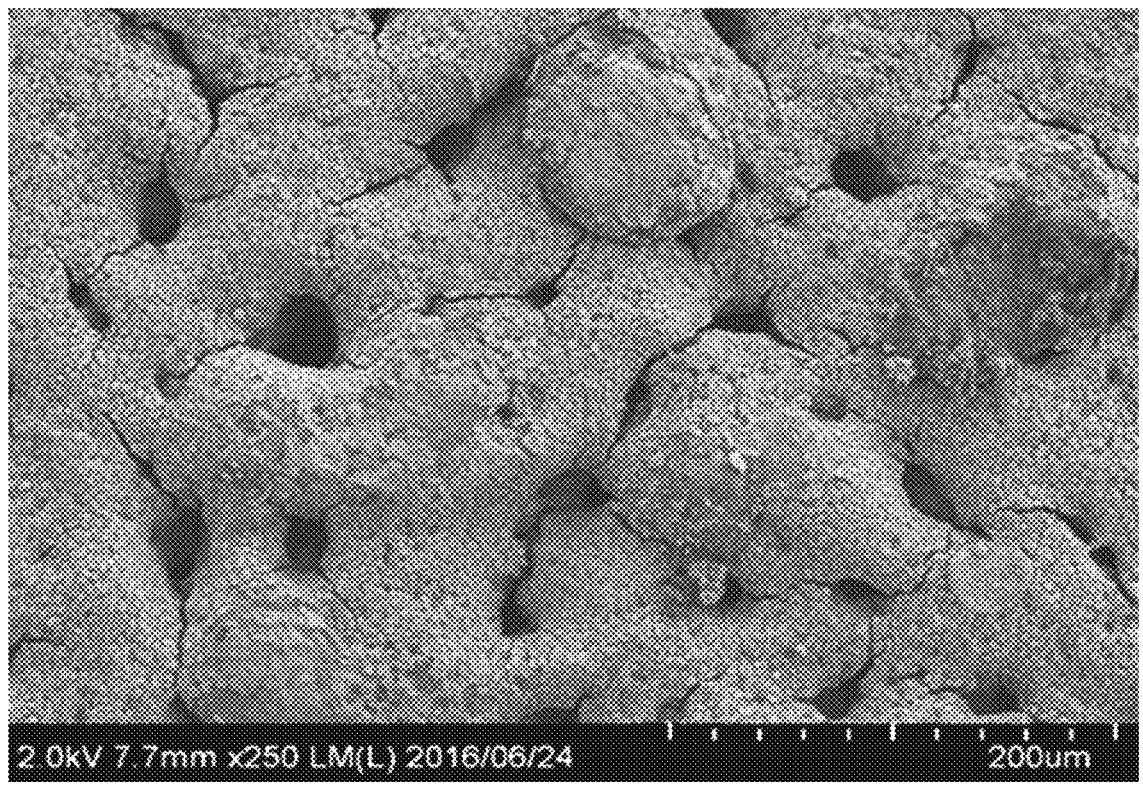
FIG. 13 is a SEM image of a catalyst layer of a cathode of Example 1.

FIG. 13 is an SEM image in which the catalyst layer of the cathode of Example 1 was observed at a magnification of 250×. As shown in FIG. 13, a plurality of pores having pore diameters exceeding 10 μm was confirmed to be present on a main surface of the catalyst layer. Further, cracks connecting the pores were also confirmed to be present. Using this SEM image, a mode diameter (μm) of the pores and an area ratio (μm) of the pores were derived by the above-mentioned method. A solvent containing 0.1% NAFION was sprayed on the cathode to form an electrolyte membrane. Then, the other electrode prepared in the same way as the cathode was provided as an anode, the electrolyte membrane was sandwiched between the anode and the cathode, and hot pressing was performed to prepare a membrane electrode assembly of Example 1.

<Electric Power Generation Characteristic Evaluation>

Subsequently, power generation characteristics of the prepared membrane electrode assembly were evaluated. After installation of the membrane electrode assembly (single cell) in an evaluation device equipped with an electronic load device, fuel (hydrogen, utilization rate of 70%, 100% RH) was supplied to an anode side at a cell temperature of 80° C. In addition, an oxidizing agent (air, utilization rate of 40%, 100% RH) was supplied to a cathode side. Next, conditioning was performed by holding the membrane electrode assembly with a current density of 1 A/cm$^2$ for 24 hours using the electronic load device. Then, at a cell temperature of 80° C., the fuel (hydrogen, utilization rate of 70%, 100% RH) was supplied to the anode side, the oxidant (air, utilization rate of 40%, 100% RH) was supplied to the cathode side, and I-V measurement was evaluated. Tables 1 and 2 collectively show the mode diameter (μm) of the pores, the area ratio (%) of the pores, cell voltages (V@1.0 A/cm$^2$ and V@0.3 A/cm$^2$) of the fuel cell at current densities of 1 A/cm$^2$ and 0.3 A/cm$^2$, five largest pore diameters (μm), a thickness (μm) of the water management layer, a thickness (μm) of the catalyst layer, presence or absence of a crack, a catalyst layer structure, and an area ratio (%) of the pores having a diameter of 10 μm or more of Examples and Comparative Examples.

Example 2

A membrane electrode assembly of Example 2 includes a water management layer having a thickness of 50 μm, and was prepared according to a procedure similar to that in Example 1. The prepared electrode of Example 2 was observed with an SEM. In addition, power generation characteristics of the prepared membrane electrode assembly were evaluated.

Example 3

A membrane electrode assembly of Example 3 includes a water management layer having a thickness of 20 μm, and was prepared according to a procedure similar to that in Example 1. The prepared electrode of Example 3 was observed with an SEM. In addition, power generation characteristics of the prepared membrane electrode assembly were evaluated.

Example 4

A membrane electrode assembly of Example 4 includes a water management layer having a thickness of 10 μm, and was prepared according to a procedure similar to that in Example 1. The prepared electrode of Example 4 was observed with an SEM. In addition, power generation characteristics of the prepared membrane electrode assembly were evaluated.

Example 5

A membrane electrode assembly of Example 5 includes a water management layer having a thickness of 5 μm, and was prepared according to a procedure similar to that in Example 1. The prepared electrode of Example 5 was observed with an SEM. In addition, power generation characteristics of the prepared membrane electrode assembly were evaluated.

Example 6

A membrane electrode assembly of Example 6 was subjected to alternate sputtering of Pt/Ni and constant sputtering of Co, and a thickness of a water management layer was set to 5 μm. The membrane electrode assembly was prepared according to a procedure similar to that in Example 1. The prepared electrode of Example 6 was observed with an SEM. In addition, power generation characteristics of the prepared membrane electrode assembly were evaluated.

Comparative Example 1

Figure 15:
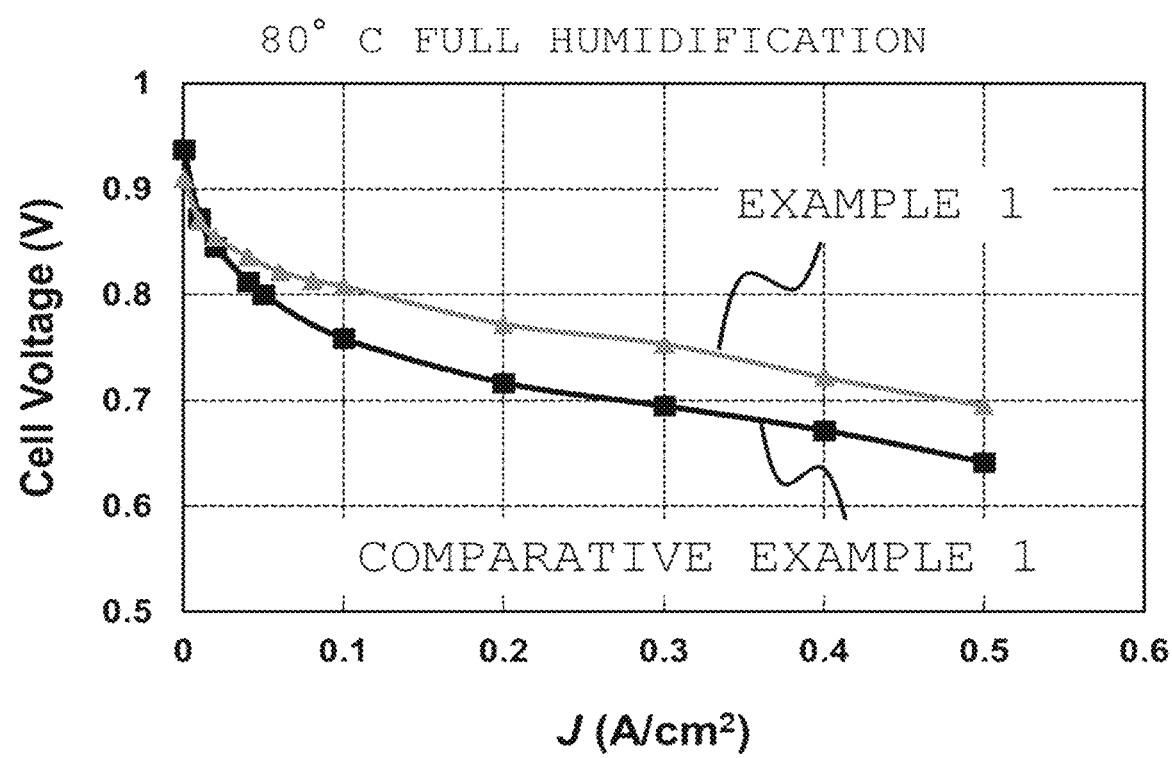
FIG. 15 is a graph showing evaluation results of I-V characteristics of Example 1 and Comparative Example 1.

A membrane electrode assembly of Comparative Example 1 includes a water management layer having a thickness of 1 μm, and was prepared according to a procedure similar to that in Example 1. The prepared electrode of Comparative Example 1 was observed an SEM. In addition, power generation characteristics of the prepared membrane electrode assembly were evaluated. In addition, FIG. 15 is a graph showing evaluation results of I-V characteristics of Example 1 and Comparative Example 1.

Comparative Example 2

Figure 14:
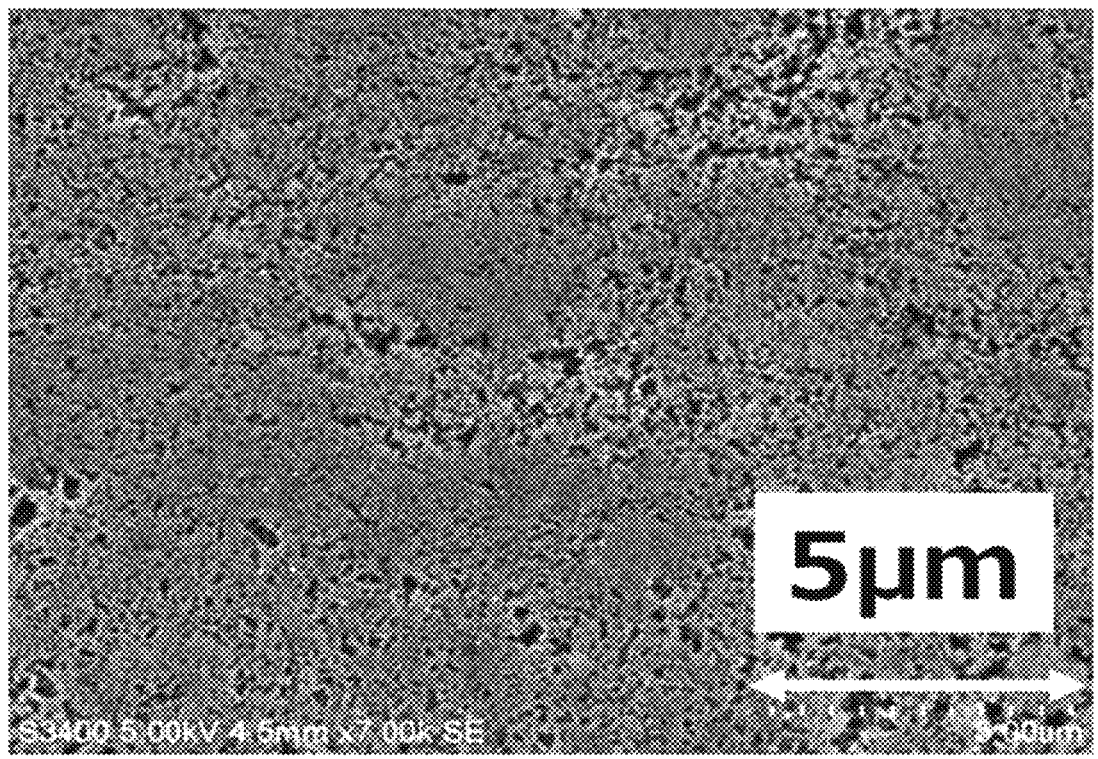
FIG. 14 is a SEM image of an electrode of Comparative Example 2.

A membrane electrode assembly of Comparative Example 2 includes a water management layer having a thickness of 80 μm, and was prepared according to a procedure similar to that in Example 1. The prepared electrode of Comparative Example 2 was observed with an SEM. FIG. 14 shows an SEM image of Comparative Example 2. In addition, power generation characteristics of the prepared membrane electrode assembly were evaluated.

TABLE 1

|  | Pore Mode Diameter (μm) | Area Ratio of Pores (%) | Cell Voltage (V) @1.0 A/cm$^2$ | Cell Voltage (V) @0.3 A/cm$^2$ | Five Largest Pore Diameters (μm) |
| --- | --- | --- | --- | --- | --- |
| Example 1 | 20 | 30 | 0.68 | 0.74 | 50, 40, 20, 10, 5 |
| Example 2 | 10 | 20 | 0.60 | 0.72 | 15, 10, 10, 10, 5 |
| Example 3 | 45 | 40 | 0.64 | 0.73 | 60, 45, 45, 30, 30 |
| Example 4 | 85 | 45 | 0.59 | 0.71 | 120, 110, 85, 80, 70 |
| Example 5 | 100 | 50 | 0.57 | 0.70 | 125, 100, 100, 95, 90 |
| Example 6 | 20 | 30 | 0.69 | 0.75 | 50, 40, 20, 10, 5 |
| Comparative Example 1 | 150 | 65 | 0.55 | 0.68 | 170, 150, 150, 150, 145 |
| Comparative Example 2 | 0.5 | 15 | 0.53 | 0.65 | 1, 0.5, 0.5, 0.5, 0.5 |

TABLE 2

|  | Thickness of Water Management Layer (μm) | Thickness of Catalyst Layer (μm) | Presence or Absence of Cracks | Catalyst Layer Structure |
| --- | --- | --- | --- | --- |
| Example 1 | 30 | 0.8 | Present | Laminated Structure |
| Example 2 | 50 | 0.8 | Present | Laminated Structure |
| Example 3 | 20 | 0.8 | Present | Laminated Structure |
| Example 4 | 10 | 0.8 | Present | Laminated Structure |
| Example 5 | 5 | 0.8 | Present | Laminated Structure |
| Example 6 | 30 | 0.9 | Present | Porous Structure |
| Comparative Example 1 | 1 | 0.8 | Present | Laminated Structure |
| Comparative Example 2 | 80 | 0.8 | Not present | Laminated Structure |

In a case where each of the water management layers of Examples 1 6 has a thickness of 30 μm, high characteristics are presented. When the water management layer is thickened as in Example 2, a pore mode diameter decreases and a pore area ratio also decreases, and accordingly characteristics deteriorate. In addition, when the water management layer is thinned as in Examples 3 to 5, although the pore mode diameter increased and the pore area ratio also increased, reaction efficiency was lowered. This is because it is difficult to manage water and flooding is liable to occur, and although the characteristics are lower than those of Examples 1 and 6, higher characteristics can be recognized compared with Comparative Examples. Since a catalyst layer having a porous structure was prepared in Example 6, good gas diffusibility is achieved, and characteristics are slightly higher than that of Example 1. In Examples, the mode diameters and the area ratios of the pores are within a preferable range. In Examples, for example, the thickness of the water management layer is changed in order to control a size and the area ratio of the pores. Another way to control the size and the area ratio of the pores is to adjust conditions for preparing the catalyst layer and the like to obtain a catalyst layer having preferable pores.

Here, some elements are expressed only by element symbols thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode, comprising:
    a catalyst layer comprising pores,
    wherein a mode diameter of the pores is in a range of from 10 to 100 µm,
    wherein the catalyst layer comprises a catalyst unit,
    wherein the catalyst unit has a porous structure or a laminated structure,
    wherein the porous structure and the laminated structure comprise nanosheets and gap layers, and
    wherein the nanosheets have no carrier of the catalyst layer,
    wherein the catalyst layer consists of noble metal, both of noble metal and an element M, an oxide of noble metal, or a mixed oxide of noble metal and an element M,
    wherein the noble metal is at least one selected from the group consisting of Pt, Ru, Rh, Os, Ir, Pd, and Au,
    wherein the element M is at least one selected from the group consisting of Co, Ni, Fe, Mn, Ta, W, Hf, Si, Mo, Ti, Zr, Nb, V, Cr, Al, and Sn,
    wherein an area ratio of the pores is a ratio of a measured area of the pores to a main surface of the catalyst layer,
    wherein the area ratio of the pores is 20% or more and 60% or less, and
    a crack connecting the pores, wherein a length/width of the crack, which is an aspect ratio of the crack, is 10 or more.
2. The electrode of claim 1, wherein the catalyst layer has a thickness in a range of from 0.05 to 3.0 µm.
3. The electrode of claim 1, wherein a value of the mode diameter of the pores is three times or more a value of a thickness of the catalyst layer.
4. The electrode of claim 1, wherein a value of the mode diameter of the pores is ten times or more a value of a thickness of the catalyst layer.
5. The electrode of claim 1, wherein the mode diameter of the pores is in a range of from 10 to 50 µm.
6. The electrode of claim 1, wherein the catalyst layer has porosity in a range of from 50 to 90 vol.%.
7. The electrode according to claim 1,
    wherein the area ratio of the pores having a diameter of 10 µm or more in the catalyst layer is in a range of from 10 to 55%.
8. The electrode of claim 1, further comprising:
    a support,
    wherein the support comprises a water management layer and a gas diffusion layer, and wherein the water management layer is disposed between the catalyst layer and the gas diffusion layer.
9. The electrode of claim 8, wherein the water management layer has a thickness in a range of from 2 to 70 µm.
10. A membrane electrode assembly, comprising the electrode of claim 1.
11. An electrochemical cell, comprising the membrane electrode assembly of claim 10.
12. A stack, comprising the membrane electrode assembly of claim 10.
13. A fuel cell, comprising the membrane electrode assembly of claim 10.
14. A fuel cell, comprising the electrochemical cell of claim 11.
15. A fuel cell, comprising the stack of claim 12.
16. A vehicle, comprising the fuel cell of claim 13.
17. A flying object, comprising the fuel cell of claim 13.
18. The electrode according to claim 1, wherein the pores are present where the catalyst unit is absent.

* * * * *